US005959385A

United States Patent [19]

Kato et al.

[11] Patent Number: 5,959,385

[45] Date of Patent: Sep. 28, 1999

[54] ROTARY MACHINE HAVING STARTER FOR VEHICLE

[75] Inventors: Akira Kato, Anjo; Takahiro Souki, Handa, both of Japan

[73] Assignee: Denso Corporation, Kariya, Japan

[21] Appl. No.: 08/733,740

[22] Filed: Oct. 18, 1996

[30] Foreign Application Priority Data

| | | | |
|---|---|---|---|
| Oct. 19, 1995 | [JP] | Japan | 7-271251 |
| Nov. 21, 1995 | [JP] | Japan | 7-302801 |
| Jul. 30, 1996 | [JP] | Japan | 8-200425 |

[51] Int. Cl.[6] .......... H02K 16/00

[52] U.S. Cl. .......... 310/112; 310/114

[58] Field of Search .......... 310/112, 113, 310/114, 102 R; 415/18; 322/10; 290/40

[56] References Cited

U.S. PATENT DOCUMENTS

| | | | |
|---|---|---|---|
| 1,375,576 | 4/1921 | Duca | 310/112 |
| 3,722,213 | 3/1973 | Carter, et al. | 60/39.16 R |
| 4,080,843 | 3/1978 | Underwood | 74/336 R |
| 4,131,188 | 12/1978 | Charchian | 192/113 B |
| 4,909,200 | 3/1990 | Sumi | 123/179 P |
| 5,014,038 | 5/1991 | Leigh-Monstevens et al. | 340/430 |
| 5,099,972 | 3/1992 | Ouchi | 192/45 |
| 5,126,582 | 6/1992 | Sugiyama | 290/46 |
| 5,132,604 | 7/1992 | Shimane et al. | 322/10 |
| 5,267,433 | 12/1993 | Burch | 60/39.142 |
| 5,349,814 | 9/1994 | Ciokajlo et al. | 60/226.1 |

FOREIGN PATENT DOCUMENTS

| | | |
|---|---|---|
| 508110 | 10/1920 | France . |
| 60-34761 | 3/1985 | Japan . |

*Primary Examiner*—Thomas M. Dougherty

*Attorney, Agent, or Firm*—Pillsbury Madison & Sutro LLP

[57] ABSTRACT

A rotary shaft of a starter motor drives a crankshaft through an overrunning clutch and a rotary shaft of a generator. When an engine is started, the crankshaft drives a driven member of the overrunning clutch through the rotary shaft of the generator. A centrifugal member of the overrunning clutch separates a torque transmitting unit from the drive member or driven member of the overrunning clutch when the engine runs at a high speed to prevent wear of the overrunning clutch.

33 Claims, 11 Drawing Sheets

ROTARY MACHINE HAVING STARTER FOR VEHICLE

BACKGROUND OF THE INVENTION

1. Field of the Invention

The present invention relates to a vehicular rotary machine which has a starting motor.

2. Description of the Related Art

A car or a motor cycle usually has a separate starter motor for starting an engine and a separate generator for supplying a battery and electric accessories of a vehicle with electric power. Therefore, they must be mechanically coupled with the crankshaft and electrically connected to the battery separately, resulting in a complex structure and in increase of the size.

JPU 60-34761 discloses a tandem unit of a starter motor and an alternator for a vehicle, in which the rotary shaft of the starter motor and a rotary shaft of an accessory such as the alternator are coupled by a clutch-roller-type overrunning clutch so that the rotary shaft of the starter motor can drive the crankshaft via the overrunning clutch and the rotary shaft of the accessory. The clutch-roller-type overrunning clutch has a drive member, a driven member, clutch rollers in a wedge-groove formed between the drive and driven members. When the driven member is rotated faster than the driving member, the clutch roller is moved in a direction to increase the gap between the roller and the groove. Such an overrunning clutch is usually installed in the starter motor to prevent the accessory's shaft, driven member and the driving member from being driven by the crankshaft.

In the above publication, when the engine starts and, consequently, the crankshaft and the alternator's shaft rotates at a high speed, the driven member of the overrunning clutch rotates at such a high speed for a long time period. As a result, the lubrication between the peripheral surface of the driven member and the clutch roller in contact with the peripheral surface becomes rough and the life time of the overrunning clutch is shortened. This is a severe problem when a speed reduction mechanism is installed between the overrunning clutch and the crankshaft to make a starter motor compact by increasing the speed of rotation thereof.

SUMMARY OF THE INVENTION

The present invention has been made to solve the above problem by providing an improved rotary machine having a starter for a vehicle, whereby a sufficient life time of the overrunning clutch installed between the rotary shaft of the starter (hereinafter referred to as starter shaft) and the rotary shaft of the accessory (hereinafter referred to as accessory shaft) can be maintained irrespective of a long-time operation of an accessory at a high speed after an engine starts.

A conventional pinion-drive-type starter is too complex to be made compact and light.

Therefore, another object of the present invention is to provide a compact and light starter for a vehicle.

According to one feature of the present invention, the stater shaft drives a crankshaft through an overrunning clutch and the accessory shaft until the engine starts and the crankshaft drives the driven member of the overrunning clutch through the accessory shaft. Because a torque transmitting unit is separated from the driving member by a simple centrifugal member of the overrunning clutch, a sufficient life time and reliability of the overrunning clutch can be ensured.

In the meantime, the "accessory of an engine" used here means a generator for a vehicle or any one of the following rotary machines: a compressor, an oil pump, a water pump, a radiator fan, an air-conditioner compressor, a P/S (power steering) pump, an air pump, and a vacuum pump.

According to another feature of the present invention, when the centrifugal force of the torque transmitting unit increases, the torque transmitting unit separates from the driving member. Therefore, problems related to the lubrication and wear are eliminated and the structure becomes simple, resulting in a compact and service-free rotary machine having less number of parts.

According to another feature of the present invention, the speed-reduction unit is disposed between the starter shaft and the overrunning clutch. Therefore, the rotational speed of the overrunning clutch can be lowered to reduce the wear of the overrunning clutch. The reduction in the centrifugal force by reducing the speed allows to reduce the spring force of the overrunning clutch, resulting in light and simple structure of the overrunning clutch. The clutch is disposed between the speed-reduction unit and the accessory shaft to disconnect the speed reduction unit as well as the starter motor from the accessory shaft when the engine starts so that power loss of the speed-reduction unit can be prevented.

According to another feature of the present invention, the speed-reduction unit and the overrunning clutch are disposed tandem. Therefore, the radial size thereof is reduced; both the unit and the clutch can be combined into a unit; torque transmitting structure is simple; common parts can be used for both the unit and the clutch; support of both unit and clutch is simple; and the bearing structure is simple because both unit and clutch are supported by the starter shaft.

According to another feature of the present invention, an eccentric-differential-planetary-gear speed-reduction mechanism (hereinafter referred to the eccentric-gear-mechanism) is used as the speed reduction unit. Therefore, a high reduction ratio can be obtained without increase in the axial length of the speed reduction unit so that the rotary machine can be installed near the engine with ease and the resonance frequency can be increased to increase the vibration resistance.

According to another feature of the present invention, the reduced-speed-torque is transmitted to the overrunning clutch by output pins which is in engagement with the eccentric-gear-mechanism and planted in the driving member of the overrunning clutch. Therefore, the overrunning clutch is disposed near the eccentric-gear-mechanism in the axial direction to couple with the latter with ease. The output pins simplifies the structure of the rotary machine.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
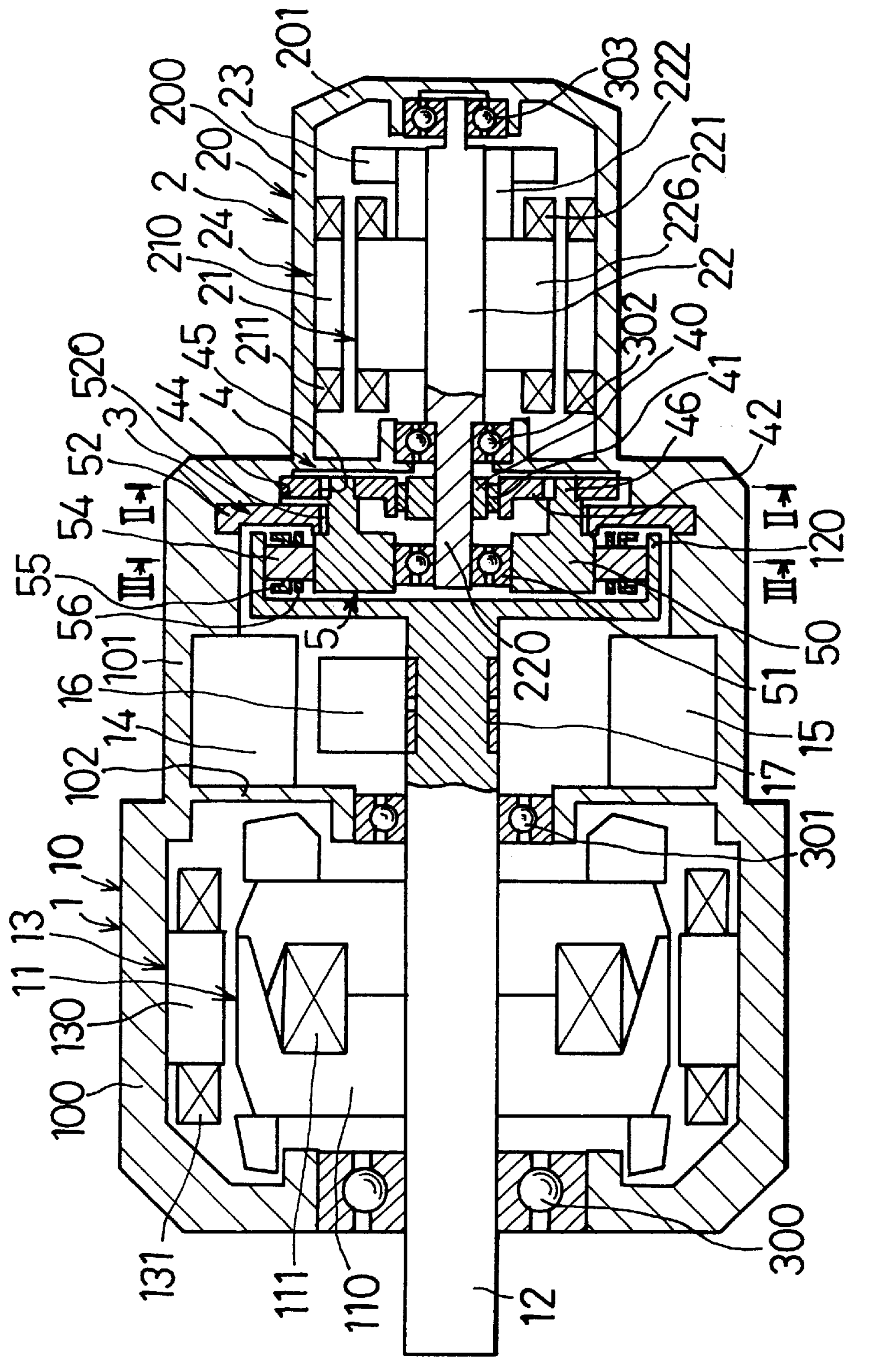
FIG. 1 is a schematic axial-sectional view illustrating a rotary machine according to a first embodiment of the present invention.

Preferred embodiments of the present invention are described hereafter.

First Embodiment

A rotary machine having a starter according to a first embodiment is described with reference to FIG. 1.

The rotary machine according to the first embodiment is composed of a generator section 1, a starter section 2 and a torque transmitting section 3 for transmitting the torque between them.

The generator section 1 is a common AC generator for a vehicle. The housing 10 of the generator section 1 is composed of a pair of bowl-shaped front and rear portions 100 and 101 and a center bracket 102. The front and rear portions 100 and 101 form closed spaces therein with the center bracket 102 disposed therebetween. The front portion 100 and the center bracket 102 support bearings 300 and 301 for a rotor 11 respectively. The rotor 11 has a Rundell-Rice type pole core 110 and a field coil 111. A stator 13 is composed of an armature core 130 fixed to an inner periphery of the housing 10 and an armature winding 131, and is disposed around the rotor 11.

A voltage regulator 14 for controlling the generator, a three-phase-full-wave-rectifier-unit 15 for rectifying alternating current generated in the armature winding 131, a brush unit 16 and a slip ring unit 17, both of which supply field current to the field coil 111, are housed in the rear portion 101 of the housing 10.

The starter section 2 is a common DC starter motor. A housing 20 of the starter section 2 is composed of a main cylindrical portion 200 fixed to an end wall of the rear portion 101 of the housing 10 of the motor section 1 and an end bracket 201 for covering the rear end of the main cylindrical member 200. The main cylindrical portion 200 and the end bracket 201 support a starter shaft 22 which carries an armature 21 via bearings 302 and 303. The armature 21 is composed of an armature core 226 secured to the starter shaft 22, an armature winding 221, and a commutator 222 fixed to the starter shaft 22. A stator 24 is composed of field coils 211 wound around pole cores 210 which are fixed to an inner periphery of the housing 20 and is disposed around the armature 21. The armature winding 221 is supplied with an electric current through a brush unit 23 and a commutator 222.

Since the above-described generator section 1 and the starter section 2 are substantially the same as a conventional AC generator and a starter motor, more detailed description about the structure and operation is omitted.

The torque transmitting section 3 is composed of a speed-reduction unit 4 and an overrunning clutch 5, which are housed tandem in the rear portion 101 of the housing 10.

The speed-reduction unit 4 is described with reference to FIGS. 1 and 2. The front end 220 of the starter shaft 22 extends through the center of the end-wall of the rear portion 101 of the housing 10. The front portion 220 of the starter shaft 22 carries an eccentric ring 40 formed to be eccentric to the axis of the starter shaft 22. A gear plate 42 is fixed coaxially with the eccentric ring 40 to be rotatable around the eccentric ring 40 via roller bearings 41. The gear plate (inner gear member) 42 has teeth 43 on the circumference thereof, which engage inner teeth 44 formed on the inner periphery of the rear portion (outer gear member) 101. The inner teeth 44 are disposed on a circle around the axis of the starter shaft 22.

In this embodiment, the gear plate 42 has twenty five (25) teeth and the rear portion (outer gear member) 101 has twenty six (26) teeth (one tooth more than the gear plate 42) so that the speed reduction ratio becomes 1/25.

The gear plate 42 has eight (8) through-holes 45 on a circle having a certain radius at every 45° interval in angle to receive eight (8) output pins 46 extending axially from a clutch inner 50, which is described later. The outer diameter of the output pins 46 is smaller than the inner diameter of the through-holes 45 so that a portion of the periphery of each of the output pins 46 is always in contact with the inner periphery of corresponding one of the through-holes 45.

Figure 3:
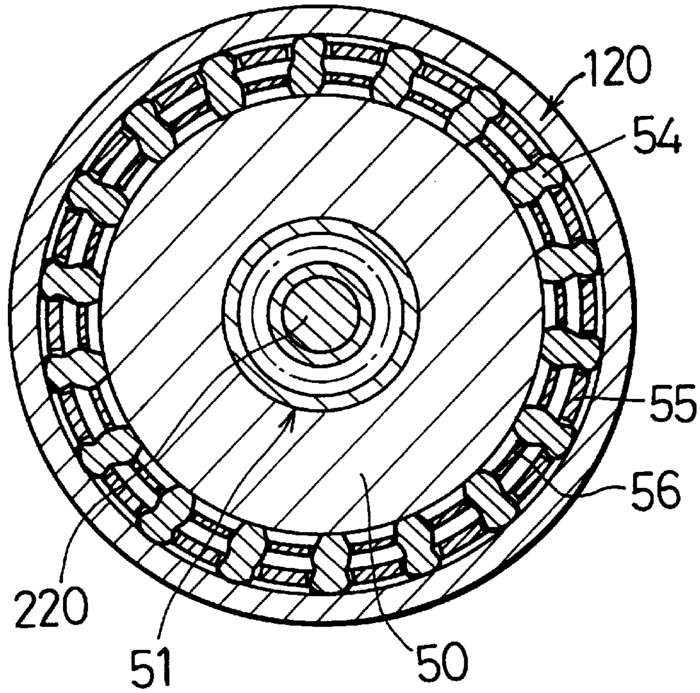
FIG. 3 is a cross-sectional view of an overrunning clutch cut along a line indicated by arrows III—III in FIG. 1.

The overrunning clutch 5 is described with reference to FIG. 1 and FIG. 3 next.

The clutch inner (driving member) 50 of the overrunning clutch 5 is rotatably fitted via a bearing 51 to the front portion 220 of the starter shaft near and in front of the eccentric ring 40. An annular stay 52 is fixed to the inner periphery of the rear portion 101 of the housing 10 to support rotatably the outer periphery of the rear portion of the cylindrical clutch inner 50 through a bearing 520. Each of the eight output pins 46 extends rearward from the rear end of the clutch inner 50 and is inserted into one of the through holes 45 as described before.

The rear end of a generator shaft (accessory shaft) 12 has a pan-like clutch outer (a driven member) 120 which surrounds the clutch inner 50. A plurality of sprags 54, a spring 56 and a retainer 55 are disposed between the inner periphery of the clutch outer 120 and the outer periphery of the clutch inner 50 as shown in FIGS. 3 and 4.

The retainer 55 is cylindrical and is securely fitted into the clutch outer 120. The retainer 55 has flanges at the opposite ends thereof and a plurality of rectangular holes in which the sprags 54 are loosely inserted.

Each of the sprags 54 is a gourd-shaped plate, which is disposed to be in contact with a portion A of the inner periphery of the clutch outer 120 and with a portion B of the outer periphery of the clutch inner 50. The center of gravity G of the sprag 54 is shifted from a line drawn between the portion A and the center of the axis (center of rotation). The portions A and B are located at the center of the contacting surfaces.

Figure 4:
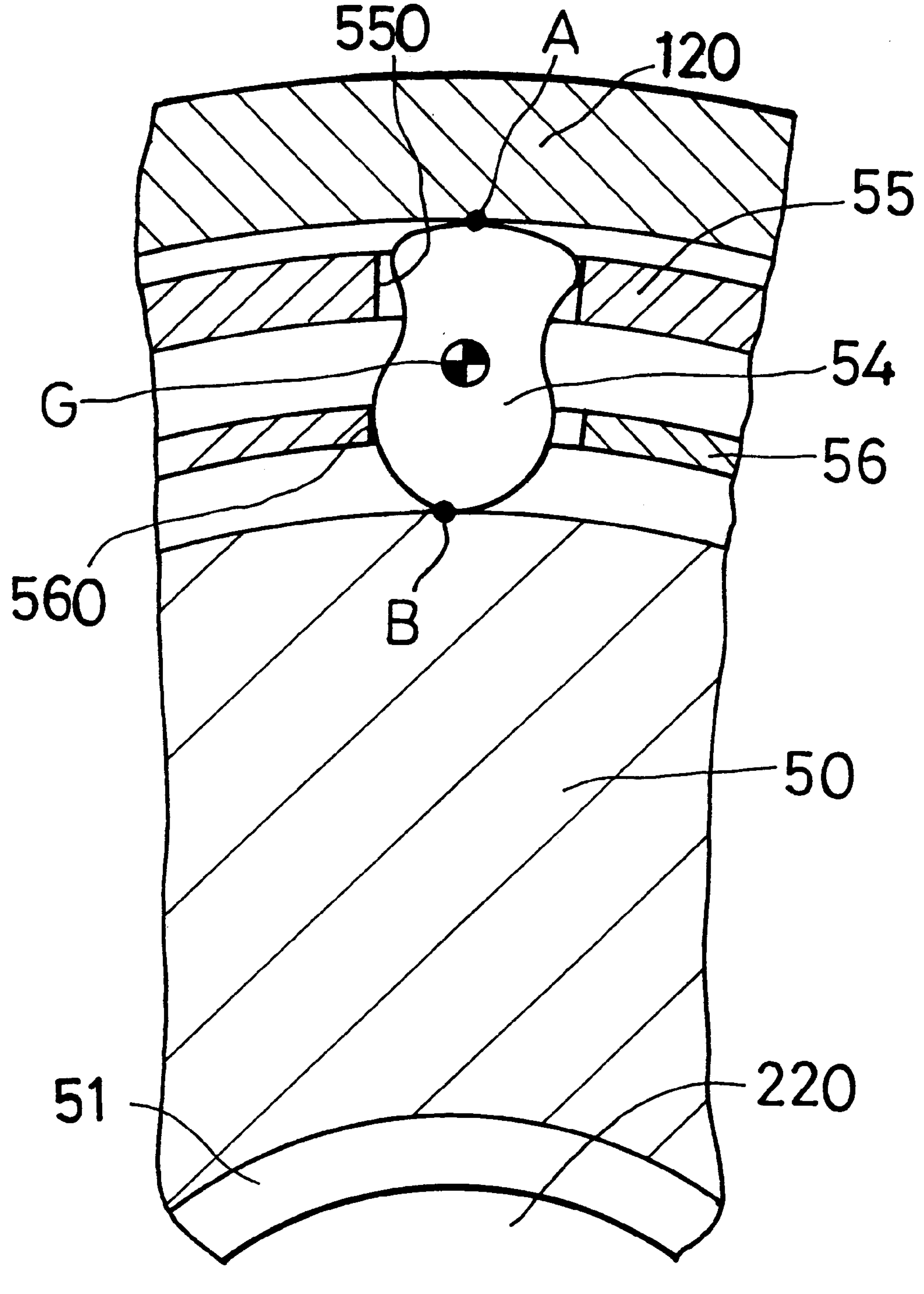
FIG. 4 is an enlarged cross-sectional view illustrating a main portion of the overrunning clutch shown in FIG. 3.

The spring 56 is a ring-shaped member made from a spring plate and is disposed inside the retainer 55 to be in contact with a portion on the side (left side in FIG. 4) of the center of the gravity of the sprag 54 with respect to the line drawn between the portion A and the center of the axis so that the spring exerts the angular moment on the sprags 54 to rise counterclockwise in FIG. 4.

A pulley or a gear (not shown) is fixed to the front end of the generator shaft 12 and connected to a crankshaft (not shown) of an engine through a belt or a gear mechanism.

[Operation]

When the starter section 2 is energized and the starter shaft 22 is rotated, the eccentric ring 40 which is carried by the starter shaft 22 causes eccentric swing of the gear plate 42. Accordingly, the gear plate 42 rotates in the direction opposite the rotation of the starter shaft 22 by one tooth-angle (360°/25) of the gear plate 42, which is a difference in the number of teeth between the teeth 43 and the inner teeth 44 during each swing circle of the gear plate 42. The rotation of the gear plate 42 is transmitted through the output pins 46 to the clutch inner 50, which rotates at 1/25 of the rotational speed of the starter shaft.

At this moment, the clutch inner 50 rotates clockwise in FIG. 4 to give the sprag 54 a counterclockwise angular moment so that the sprag 54 swings counterclockwise in a certain angle relative to the portion A where frictional force is generated. Therefore, the sprag 54 rises and engages the clutch inner 50 and the clutch outer 120 more tightly so that the torque can be transmitted from the clutch inner 50 through the sprag 54, the clutch outer 120, the accessory shaft 12 to the crankshaft and the engine (not shown).

When the engine starts and the pan-like portion (clutch outer) rotates at a speed higher than the clutch inner 50, the clutch outer 120 rotates clockwise relative to the clutch inner 50, thereby causing the sprag 54 to rotate clockwise relative to the portion A. Consequently, the sprag 54 lies down and slides on the inner periphery of the clutch outer 120, so that the torque transmission from the engine to the starter shaft 22 is interrupted. Thereafter, the power supply to the starter section is stopped.

When the engine runs at a high speed, the retainer 55, which is fixed to the clutch outer 120, is rotated at the same speed, and a centrifugal force is exerted on the center of gravity of the sprag 54. Because the center of gravity is shifted backward from the line drawn between the portion A and the center of the axis, swing torque is generated to rotate the sprag 54 about the portion A where the frictional force is generated. As a result, the sprag 54, which has been sliding on the clutch inner 50, floats and disengages from the clutch inner 50 completely.

The sprags 54 are installed in the retainer 55 so as to disengage from the clutch inner 50 when the clutch outer rotates at a speed higher than the rotational speed at the engine starting and lower than the rotational speed at the engine idling.

As described above, because the overrunning clutch interrupts the torque transmission mechanically, lubrication of the clutch at a high speed is not necessary and only the generator section 1 has to be designed for the high speed operation.

Second Embodiment

Figure 5:
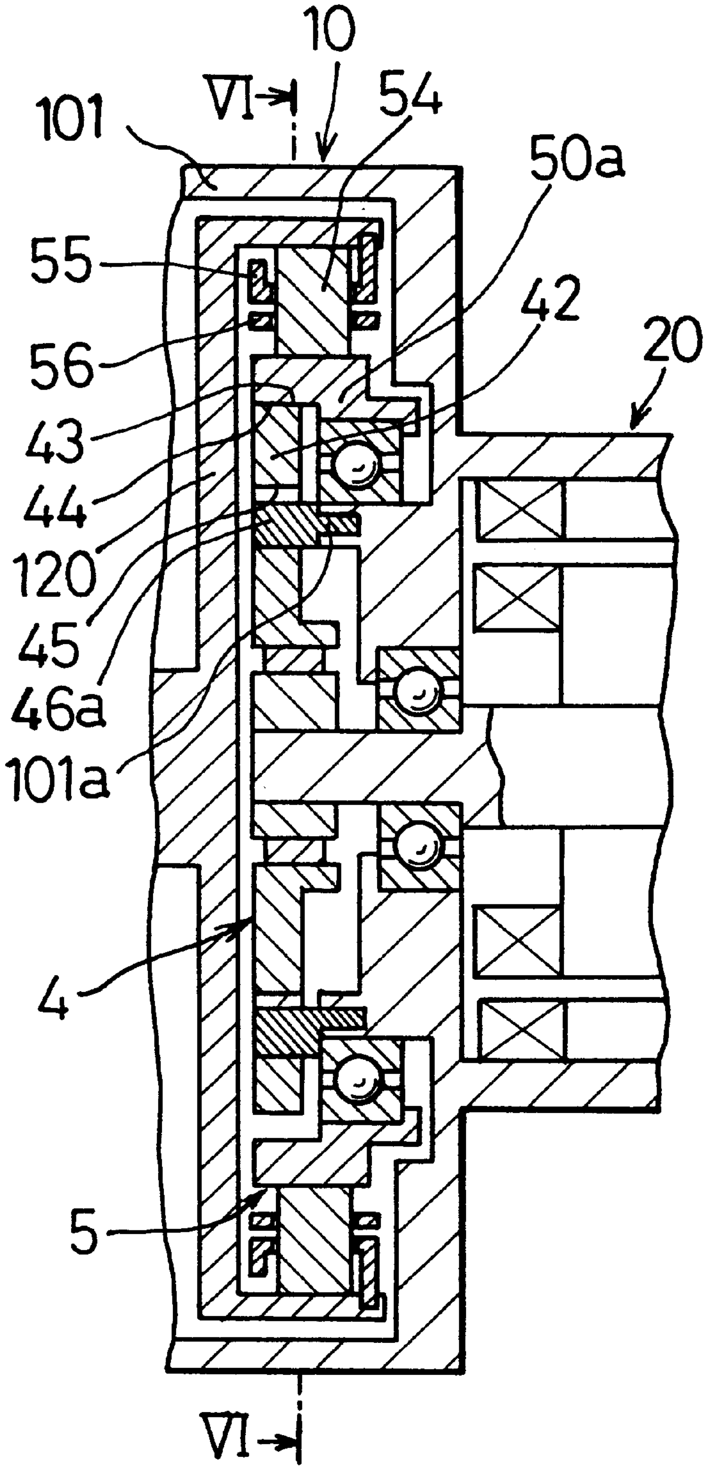
FIG. 5 is a schematic axial-sectional view illustrating a rotary machine according to a second embodiment of the present invention.
Figure 6:
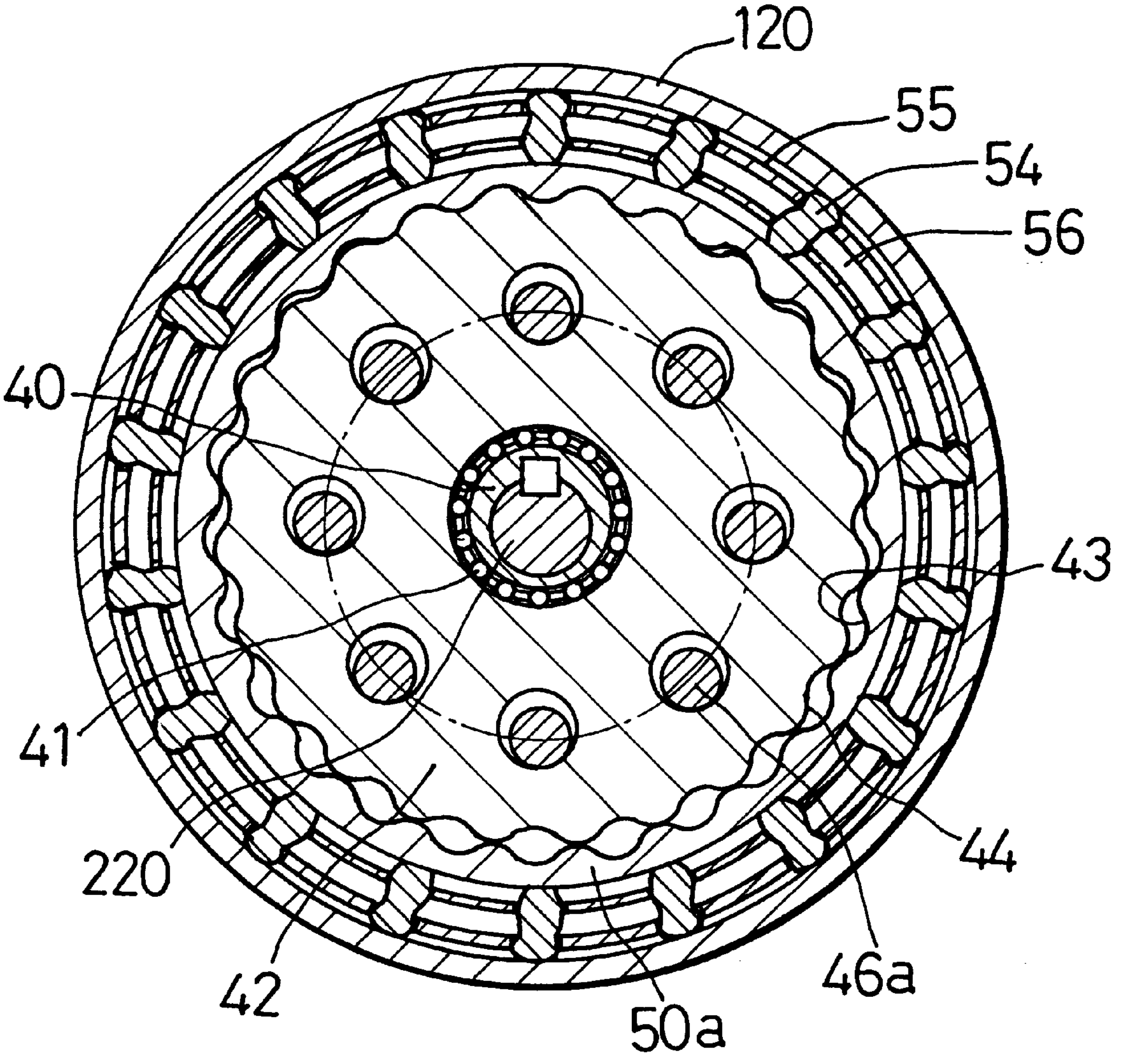
FIG. 6 is a cross-sectional view of an overrunning clutch and an eccentric-gear-mechanism cut along a line indicated by arrows VI—VI in FIG. 5.

A second embodiment is described with reference to FIGS. 5 and 6 next. In order to simplify the description, the same reference numerals are put on the structural elements which have corresponding functions as those of the first embodiment.

The speed-reduction unit 4 and the overrunning clutch 5 of the torque transmitting section 3 are disposed to be coaxial with each other.

The inner teeth 44 formed on the inner periphery a clutch inner 50*a* of the overrunning clutch 5 partly engages the teeth 43 of the gear plate 42. A cylindrical clutch-inner-support 101*a* extends from the end wall of the rear portion 101 of the housing 10, which rotatably supports a clutch inner 50*a* via a bearing 51. A plurality of output pins 46*a* extend forward from the front end of the clutch-inner-support 101*a* into the through holes 45 of the gear plate 42 so that the clutch inner 50*a* transmits the reduced speed-torque.

The operation is the same as the first embodiment. In order to rotate the clutch section counterclockwise, the starter shaft 22 must be rotated in the direction (clockwise) opposite to that of the first embodiment.

Thus, the axial length of the torque transmitting section 3 is reduced to provide a short-sized rotary machine.

Third embodiment

Figure 7:
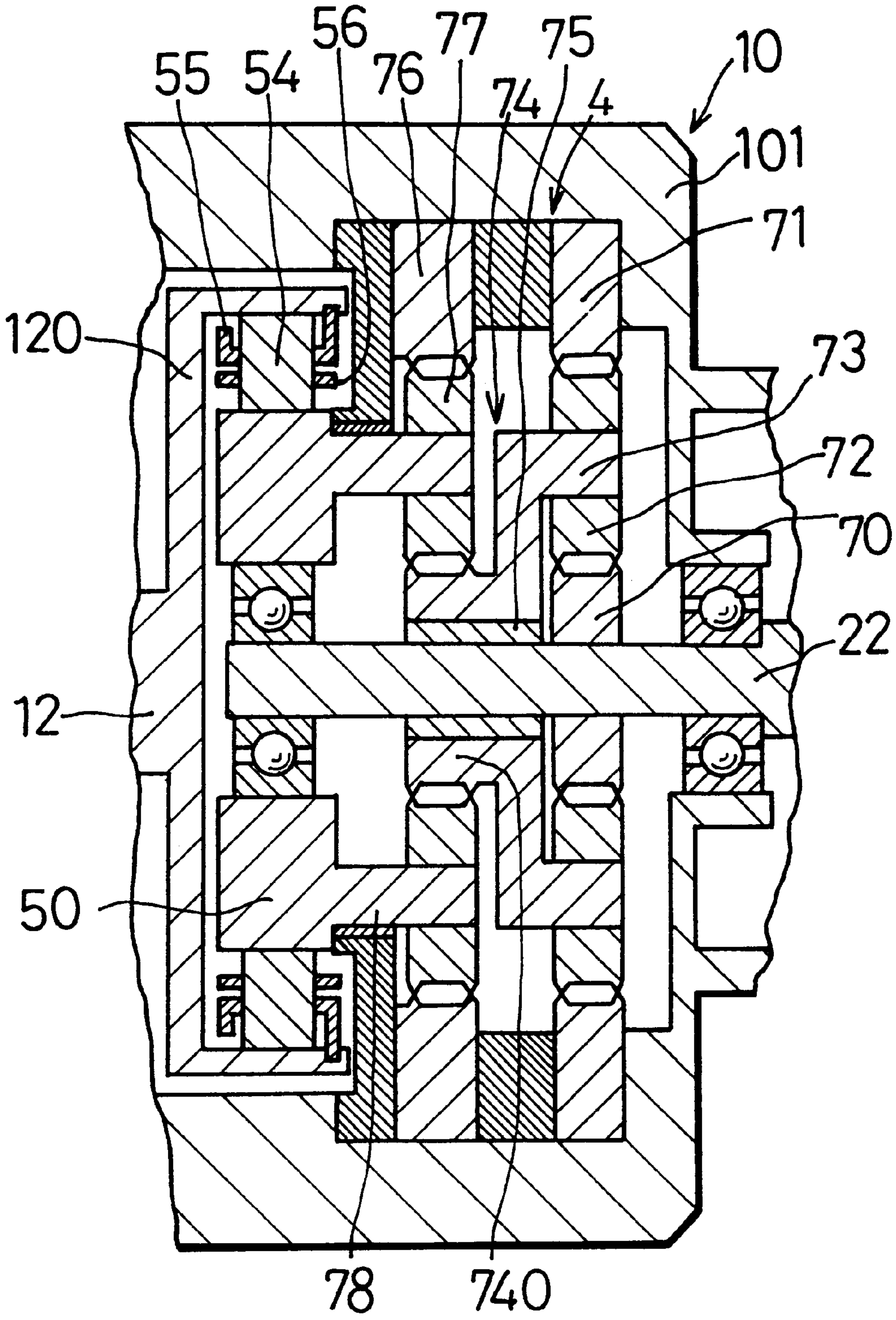
FIG. 7 is a schematic axial-sectional view illustrating a main portion of a rotary machine according to a third embodiment of the present invention.

A third embodiment is described with reference to FIG. 7. In order to simplify the description, the same reference numerals are put on the structural elements corresponding to those of the first embodiment.

A two-stage-planetary-speed-reduction-mechanism is used as the speed-reduction unit 4 of the torque transmitting section 3 in this embodiment. Other portions are the same as those of the first embodiment, and only the speed-reduction unit 4 is described hereafter.

The speed-reduction unit 4 has a sun gear 70 carried by the starter shaft 22. An internal gear 71 is fixed to the rear portion 101 of the housing 10 to surround the sun gear 70. Planetary gears 72 are supported rotatably by pins 73 through bushes and engage the sun gear 70 and the internal gear 71.

A boss portion 740 of a flange 74 is rotatably supported by the starter shaft 22 via a bearing 75 in front of the sun gear 70. The pins 73 extend backward from the flange 74. Gear teeth are formed on the outer periphery of the boss portion 740 to function as a second sun gear. A second internal gear 76 is fixed to the inner periphery of the rear portion 101 of the housing 10 coaxially with the boss portion 740. Second planetary gears 77 are rotatably supported by output pins 78 via bushes (not shown) and engage the second sun gear 740 and the second internal gear 76. The output pins 78 extend backward from the clutch inner 50 as those of the first embodiment.

Thus, the rotational speed of the starter shaft 22 is reduced and transmitted through the sun gear 70, the planetary gears 72, the pins 73, the boss portion 740 of the flange 74, the second planetary gear 77 and the output pins 78 to the clutch inner 50, and the same effect as the first embodiment is obtained.

Fourth Embodiment

Figure 8:
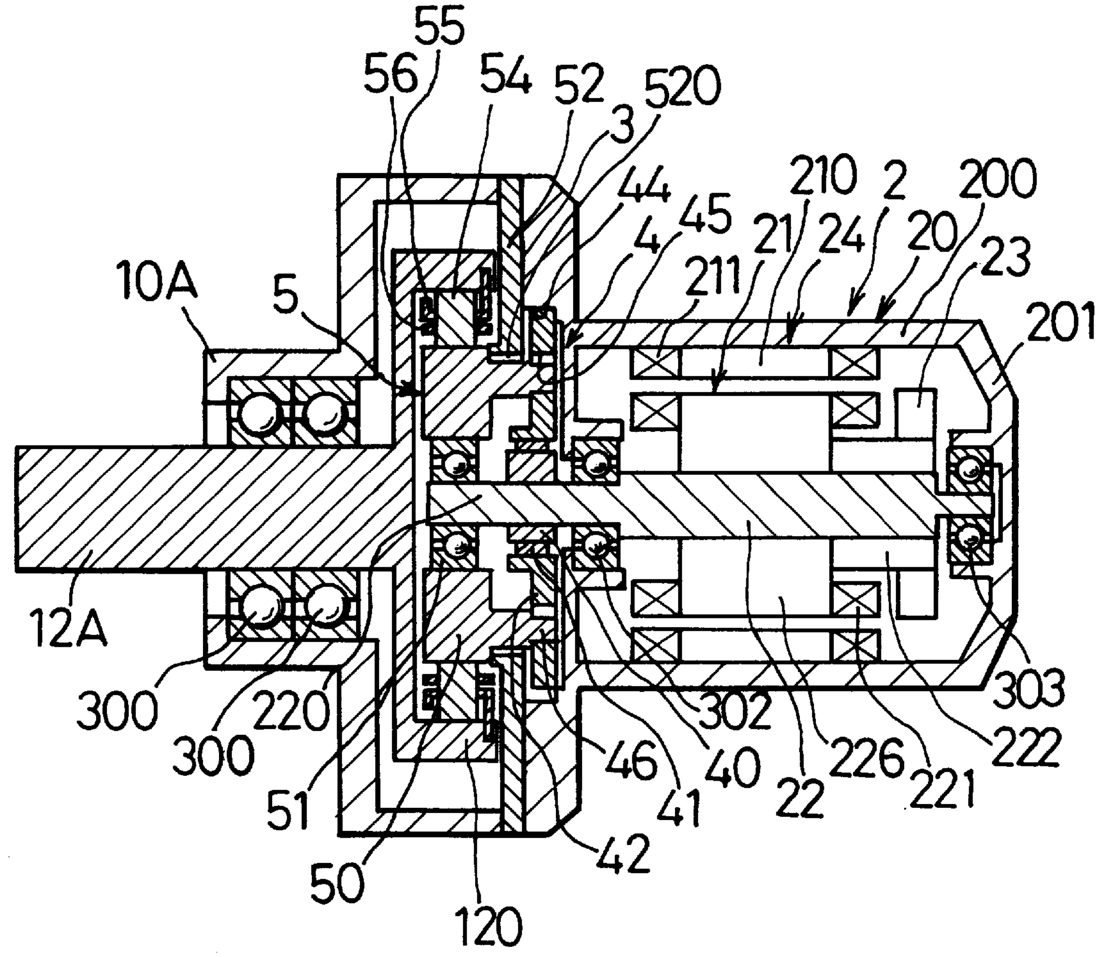
FIG. 8 is a schematic axial-sectional view illustrating a main portion of a rotary machine according to a fourth embodiment of the present invention.

A fourth embodiment is described with reference to FIG. 8. In order to simplify the discussion, the structural elements having the same function as the first embodiment have the same reference numerals.

Figure 2:
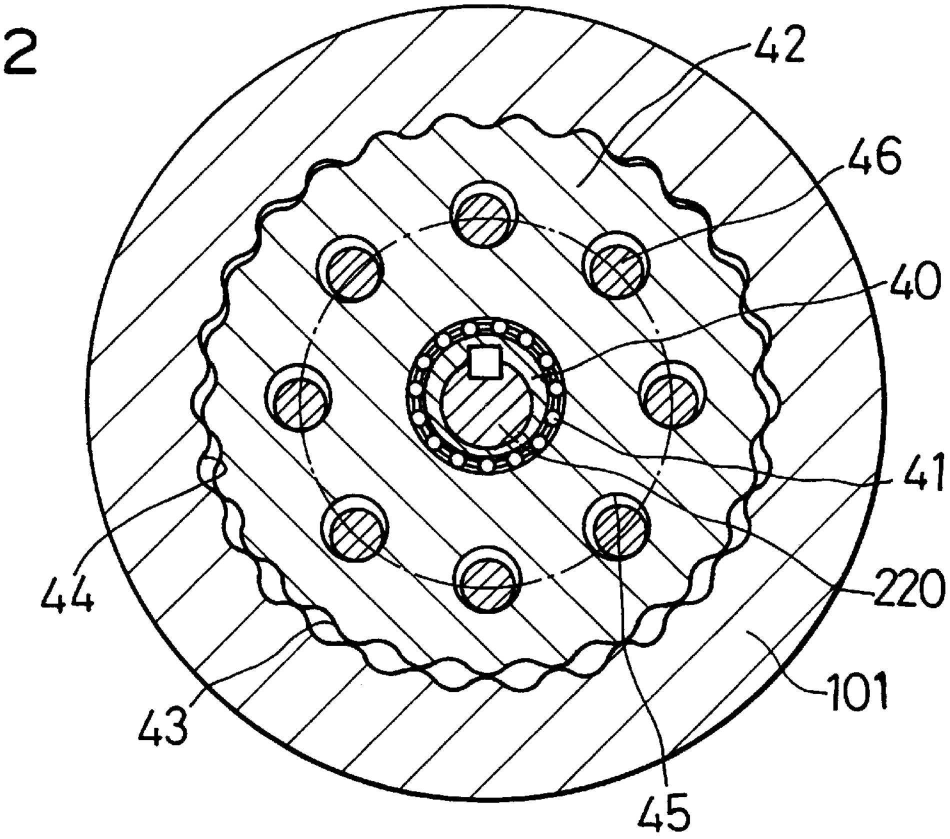
FIG. 2 is a cross-sectional view cut along a line indicated by arrows II—II in FIG. 1.

This embodiment does not have the generator section 1 as shown in FIG. 1. Therefore, an output shaft 12A corresponding to the accessory shaft is rotatably supported by a housing 10A via a pair of bearings 300. The output shaft 12A is connected directly or through a belt to the crankshaft of the engine.

When the engine starts and the output shaft 12A rotates at a high speed, the overrunning clutch 5 of the torque transmitting section 3 is completely disconnected. Therefore, a starter for a vehicle having an axially-reduced overrunning clutch can be provided without the conventional pinion-drive mechanism or a special lubrication arrangement.

Figure 9:
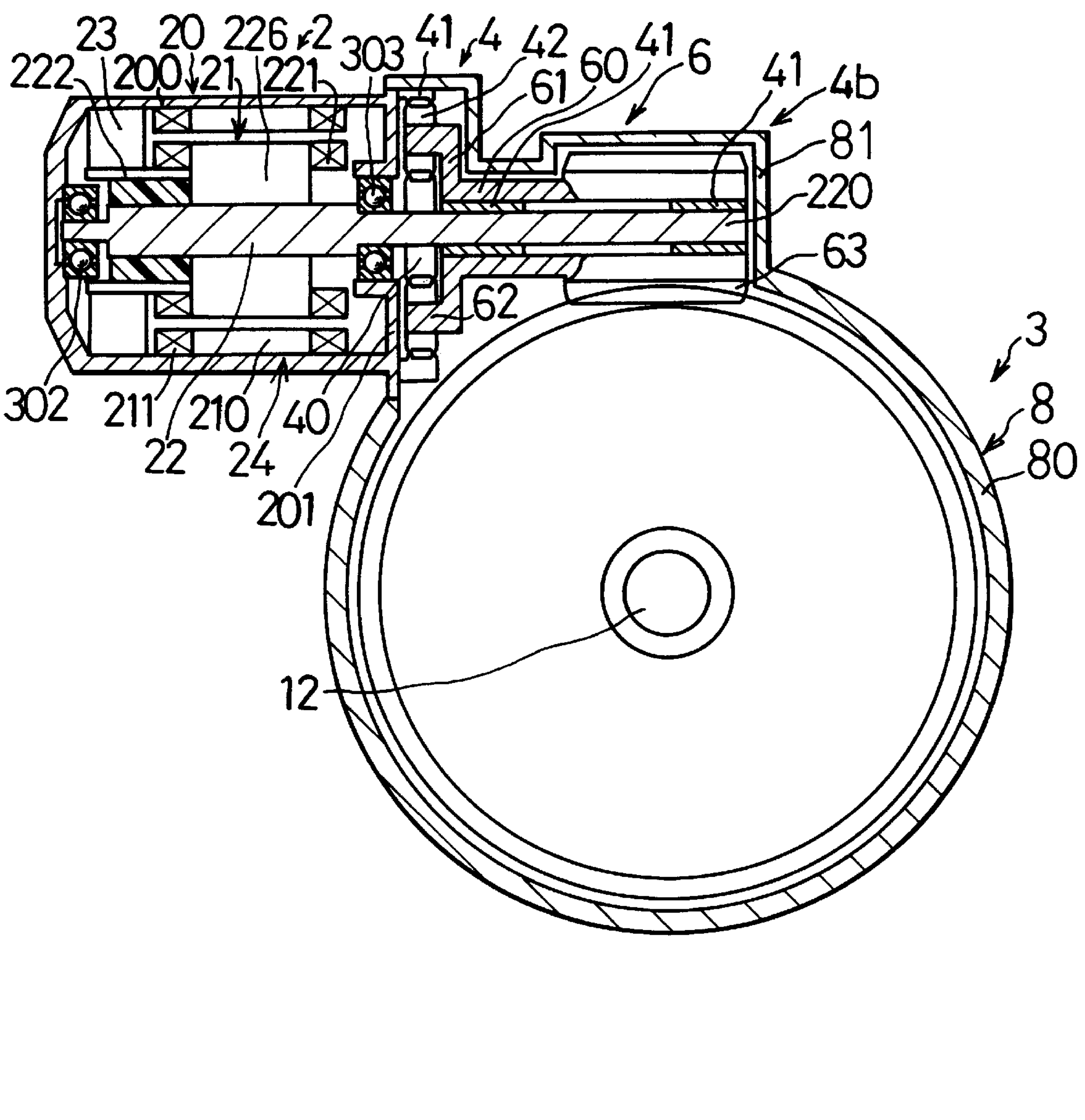
FIG. 9 is a schematic axial-sectional view illustrating a starter section of a rotary machine according to a fifth embodiment of the present invention.

The output shaft 12A, shown in FIG. 9, rotatably supported by the housing 10A via a pair of the bearings 300 can be installed in the second embodiment (shown in FIGS. 5 and 6) or in the third embodiment (shown in FIG. 7) to provide a starter for a vehicle having an axially reduced overrunning clutch.

Fifth Embodiment

A rotary machine according to a fifth embodiment is described with reference to FIGS. 9 and 10.

In order to simplify the discussion, the structural elements having the same function as the first embodiment have the same reference numerals.

The starter-generator is composed of the starter section 1, the generator section 2 and a torque transmitting unit 3 for transmitting torque therebetween.

The torque transmitting section 3 is described hereafter.

The torque transmitting section 3 is composed of a speed-reduction unit 4, an overrunning clutch 5 and a worm gear (skew gear) unit 6. The overrunning clutch 5 and the worm gear unit 6 which are housed tandem (axially side by side) in a gear housing 8.

The gear housing 8 is composed of a large cylindrical bottomed portion 80 which has approximately the same diameter as the front portion 100 of the generator housing 10 and is fixed to the front end of the front portion 100 and a small cylindrical bottomed portion 81 which has approximately the same diameter as the main cylindrical portion 200 of the starter housing 20 and is fixed to the end bracket 201 of the housing 20. The small cylindrical portion 81 is formed integrally with the large cylindrical portion 80 to cover the upper opening thereof.

The front portion 220 of the starter shaft 22 extends inside the small cylindrical porition 81 of the gear housing 8 and carries a sun gear 40 at a portion adjacent to a bearing 303. An internal gear 41 is formed on the inner periphery of the small cylindrical portion 301, and planetary gears 42 engage the sun gear 40 and the internal gear 41, composing a planetary-gear-speed-reduction-unit.

The starter shaft 22 rotatably carries a cylindrical member 60 through a pair of bearings. The cylindrical member 60 has a large disk portion 61, which has a plurality of pins 62 rotatably supporting the planetary gears 42. An input gear of the worm gear unit 6 is formed on the outer periphery of the cylindrical member 60.

The worm gear unit 6 of this embodiment can be replaced with a hypoid gear unit or a screw gear unit. The worm gear unit 6 provides a large speed-reduction ratio (e.g. 1:40) and a simple structure without excessive engaging-surface-pressure. Therefore, the starter section 2 and the worm gear unit 6 are made compact, thereby providing a short-sized rotary machine.

Figure 10:
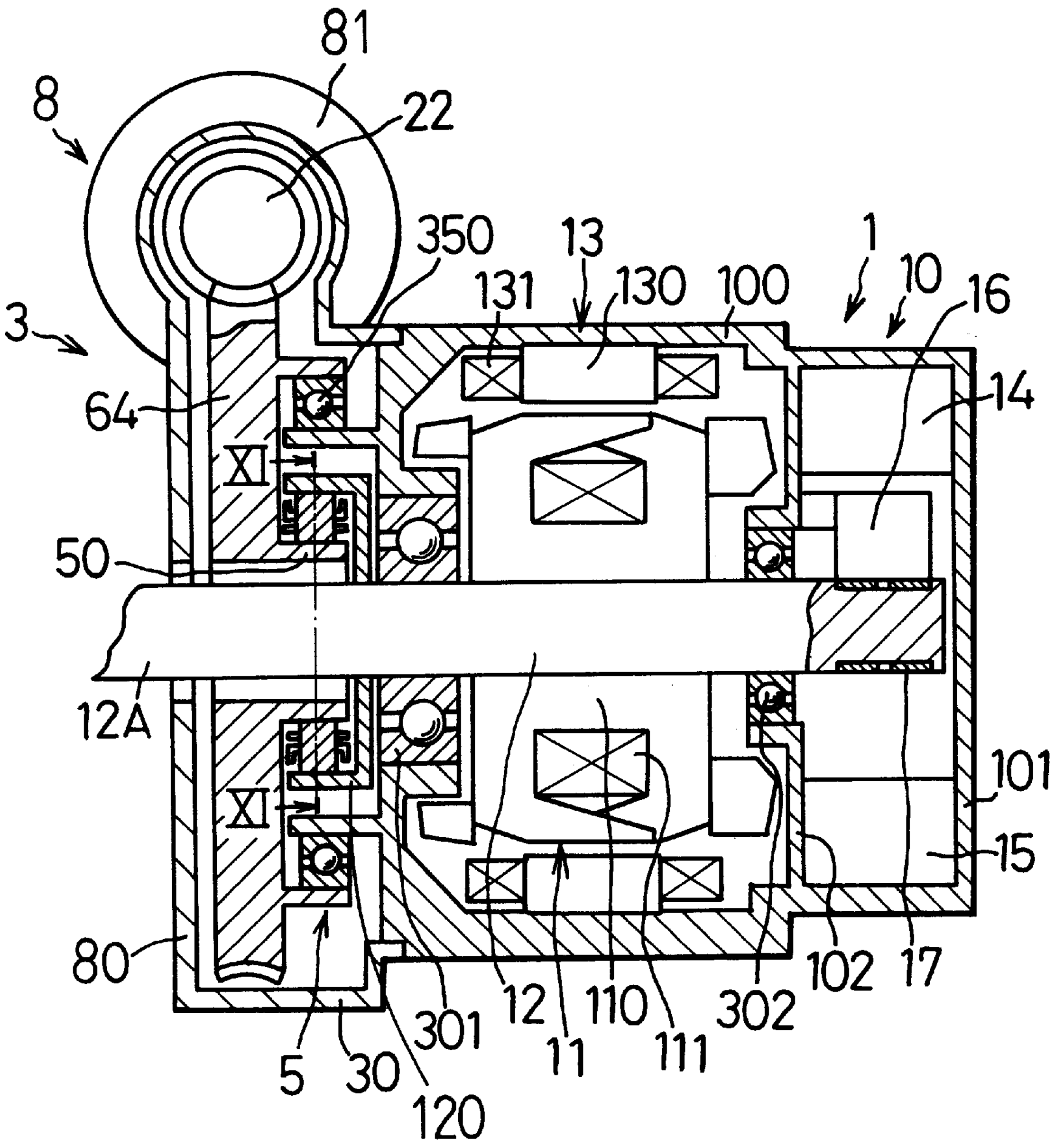
FIG. 10 is a schematic axial-sectional view illustrating a generator section of the rotary machine according to the fifth embodiment.
Figure 11:
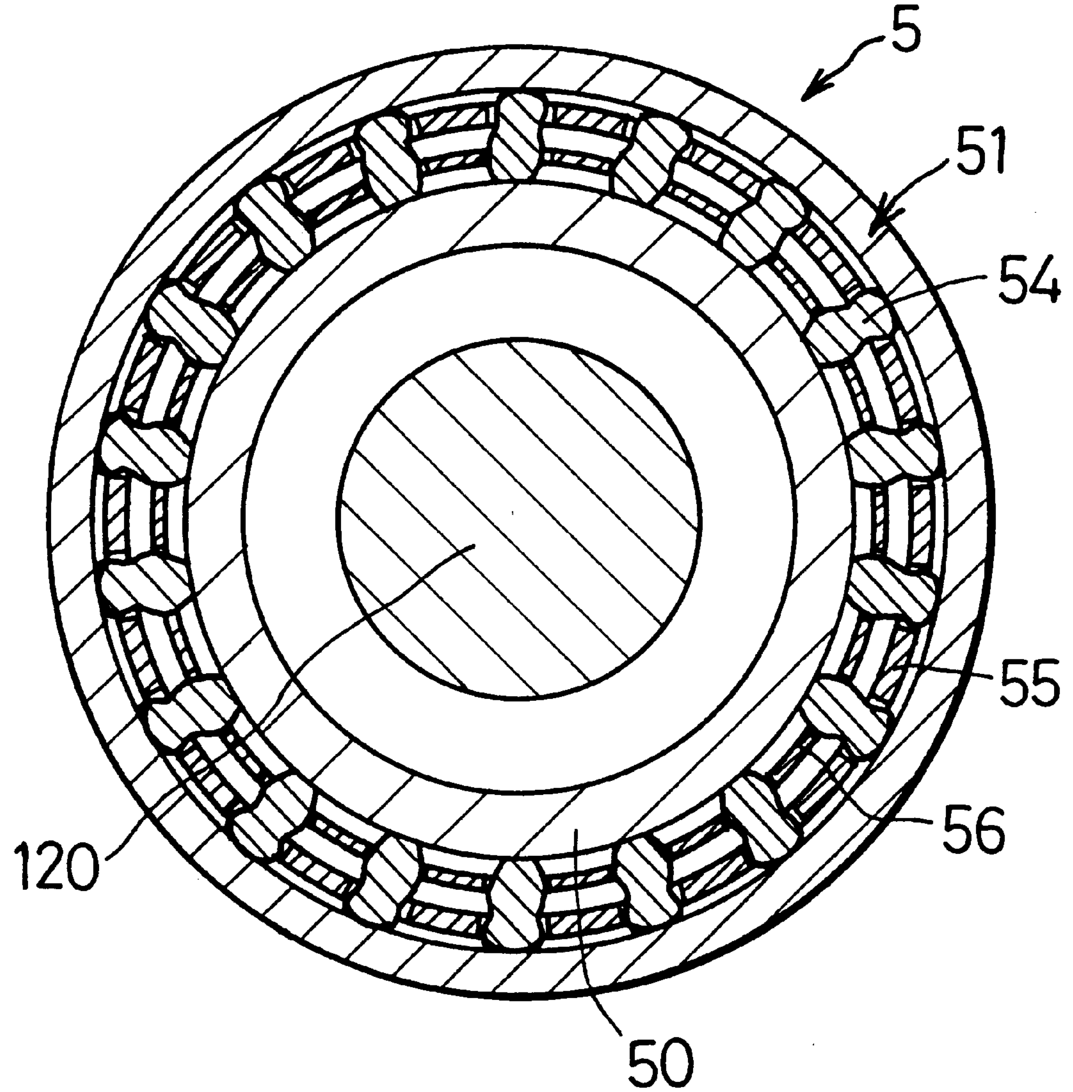
FIG. 11 is a cross-sectional view of an overrunning clutch cut along a line indicated by arrows XI—XI in FIG. 10.
Figure 12:
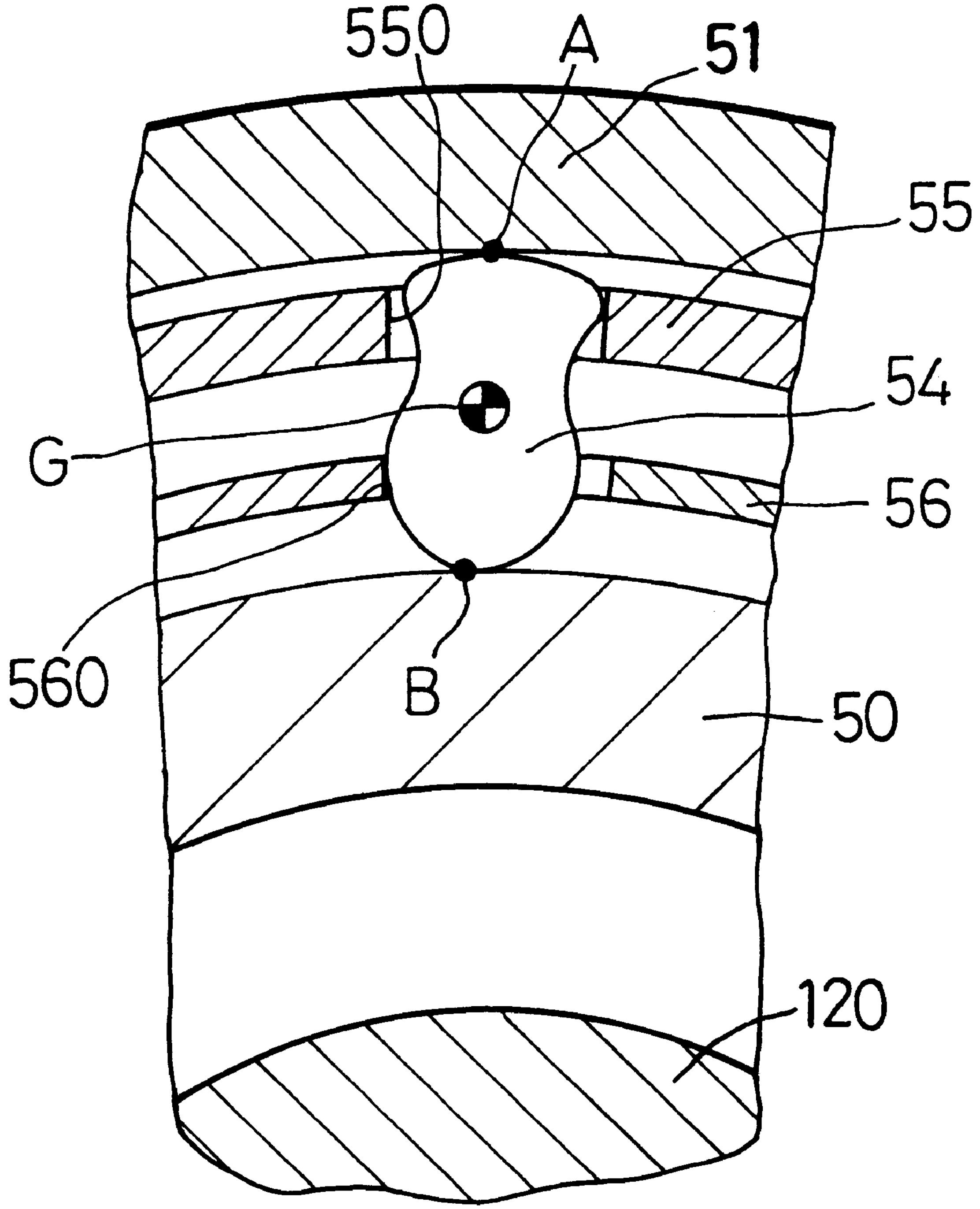
FIG. 12 is an enlarged cross-sectional view illustrating a main portion of the overrunning clutch shown in FIG. 11.

An output (reduced-speed) gear 64 is rotatably supported by the front portion 100 of the housing 10 via a bearing 350 coaxially with the front end 12A of the generator shaft 12, which extends perpendicularly to the starter shaft 22 and left from the housing 10 in FIG. 10.

The overrunning clutch 5 is didposed inside the large cylindrical portion 80 coaxially with the front end 12A of the generator shaft 12 which extends left from the housing 10 in FIG. 10.

The overrunning clutch 5 has the clutch inner 50 which extends backward from an inner portion of the output gear 64 of the worm gear 6 as shown in FIG. 10 and the clutch outer 120 which is carried by the front end 12A of the generator shaft 12 and fitted to the outer periphery of the clutch inner 50.

When the starter section 2 is energized and the starter shaft 22 is rotated, the rotational speed of the starter shaft 22 is reduced by the planetary-gear-speed-reduction-unit 4 and the worm gear unit 6, and transmitted through the clutch inner 50 of the overrunning clutch 50, the sprags 54, and the clutch outer 120 to the generator shaft 12 and to the crankshaft as described before.

Because the planetary-gear-speed-reduction-unit 4 and the worm gear 6 are connected to the generator shaft 12 perpendicular thereto and a high ratio speed reduction can be provided with a simple structure, a simple and an axially short rotary machine can be provided.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rotary machine for a vehicle comprising:

an accessory section having an accessory shaft connected to a crankshaft of an engine;

a starter section, disposed tandem with said accessory section and having a starter shaft;

an overrunning clutch for driving said accessory shaft in one direction, said overrunning clutch having a first member connected to said starter shaft, a second member connected to said accessory shaft, and a centrifugal mechanism, disposed between said first and second members, for disengaging said first member from said second member when said engine rotates said second member at a higher speed than said first member, wherein said centrifugal mechanism comprises a plurality of sprags, a retainer for loosely holding said sprags and a spring member for exerting angular moment on said sprags so that said sprags slide on a surface of one of said first and second members due to relative movement of said first and second members when said engine starts and float between said first and second members due to centrifugal force applied to said sprags when said engine rotates at a speed higher than a starting speed thereof.

2. A rotary machine as claimed in claim 1, wherein said accessory shaft is connected to a crankshaft of said engine through a belt.

3. A rotary machine as claimed in claim 1 further comprising a speed-reduction unit, disposed between said starter shaft and said accessory shaft for increasing engine starting torque transmitted from said starter shaft to said accessory shaft.

4. A rotary machine as claimed in claim 3, wherein said speed-reduction unit is disposed between said starter shaft and said overrunning clutch.

5. A rotary machine as claimed in claim 3, wherein said speed-reduction unit comprises a sun gear fitted to said starter shaft, an internal gear fixed around said sun gear, a planetary gear in engagement with said sun gear and said internal gear for rotating around said sun gear, a pin for rotatably supporting said planetary gear, and said pin is fixed to said first member of said overrunning clutch.

6. A rotary machine as claimed in claim 3, wherein said speed-reduction unit and said overrunning clutch are supported in tandem by a motor shaft.

7. A rotary machine as claimed in claim 3, wherein said speed-reduction unit comprises;

an eccentric ring carried eccentrically by said starter shaft, and an eccentric-differential-planetary-gear speed-reduction mechanism including an inner gear member having a number of teeth formed on an outer periphery thereof and rotatably disposed around said eccentric ring, an outer gear member disposed around said inner gear member and having a different number of teeth in engagement with said inner gear member and a pin disposed to extend axially and rotate around said starter shaft for transmitting an orbital motion of said inner gear member.

8. A rotary machine as claimed in claim 7, wherein said inner gear member has a hole, and said pin is disposed in said hole so that an outer periphery of said pin partly engages said hole.

9. A rotary machine as claimed in claim 8, wherein said pin is fixed to said first member of said overrunning clutch.

10. A rotary machine as claimed in claim 8, wherein said second member of said overrunning clutch is disposed around said first member.

11. A rotary machine as claimed in claim 3, wherein said overrunning clutch is disposed to be adjacent to said speed reduction unit.

12. A rotary machine as claimed in claim 3, wherein said speed reduction unit comprises a worm gear mechanism.

13. A rotary machine as claimed in claim 3, wherein said speed-reduction unit comprises:

an eccentric ring carried eccentrically by one of said starter shaft and accessory shaft;

an inner gear member having a number of teeth formed on an outer periphery thereof and rotatably disposed around said eccentric ring;

an outer gear member disposed around said inner gear member and having a different number of teeth in engagement with said inner gear member; and a pin extending axially to be rotatable around said starter shaft for transmitting an orbital motion of said inner gear member.

14. A rotary machine as claimed in claim 13, wherein said outer gear is integral with said first member of said overrunning clutch.

15. A rotary machine as claimed in claim 3, wherein said speed-reduction unit comprises:

a sun gear fitted to said starter shaft;

an internal gear connected to said driving member of said overrunning clutch and fixed around said sun gear; and a planetary gear in engagement with said sun gear and said internal gear and disposed to be rotatable around said sun gear.

16. A rotary machine as claimed in claim 15, wherein said second member of said overrunning clutch is disposed around said first member thereof.

17. A rotary machine for a vehicle comprising:

an output section having an output shaft connected to a vehicle engine and an overrunning clutch; and a motor section, disposed tandem with said output section and having a motor shaft connected to said overrunning clutch, wherein said overrunning clutch has a first member connected to said motor shaft, a second member connected to said output shaft and a centrifugal mechanism disposed between said first member and said second member for disengaging said first member from said second member when said engine rotates said second member at a speed higher than said first member, and wherein said centrifugal mechanism comprises a plurality of sprags, a retainer for loosely holding said sprags and a spring member for exerting angular moment on said sprags so that said sprags slide on a surface of one of said first and second members due to relative movement of said first and second members when said engine starts and float between said first and second members due to centrifugal force applied to said sprags when said engine rotates at a speed higher than a starting speed thereof.

18. A rotary machine as claimed in claim 17, wherein said first member of said overrunning clutch comprises a cylindrical inner member and said second member comprises a cylindrical outer member disposed around said inner member.

19. A rotary machine as claimed in claim 17 further comprising a speed-reduction unit, disposed between said output shaft and said motor shaft for increasing engine starting torque transmitted from said motor shaft to said output shaft.

20. A rotary machine as claimed in claim 19, wherein said speed-reduction unit transmits torque between said motor shaft and said overrunning clutch.

21. A rotary machine as claimed in claim 19, wherein said speed-reduction unit and said overrunning clutch are supported tandem by motor shaft.

22. A rotary machine as claimed in claim 19, wherein said speed-reduction unit comprises;

an eccentric ring carried eccentrically by said starter shaft, and an eccentric-differential-planetary-gear speed-reduction mechanism including an inner gear member having a number of teeth formed on an outer periphery thereof and rotatably disposed around said eccentric ring, an outer gear member disposed around said inner gear member and having a different number of teeth in engagement with said inner gear member and a pin disposed to extend axially and rotate around said motor shaft for transmitting an orbital motion of said inner gear member.

23. A rotary machine as claimed in claim 22, wherein said inner gear member has a hole, and said joint pin is disposed in said hole so that an outer periphery of said pin partly engages said hole.

24. A rotary machine as claimed in claim 23, wherein said pin is fixed to said first member of said overrunning clutch.

25. A rotary machine as claimed in claim 19, wherein said second member of said overrunning clutch is disposed around said first member.

26. A rotary machine as claimed in claim 19, wherein said speed-reduction unit comprises a sun gear fitted to said starter shaft or motor shaft, an internal gear fixed around said sun gear, a planetary gear in engagement with said sun gear and said internal gear for rotating around said sun gear, and a pin for rotatably supporting said planetary gear, wherein said pin is fixed to said second member of said overrunning clutch.

27. A rotary machine as claimed in claim 19, wherein said speed-reduction unit comprises:

a sun gear fitted to said starter shaft;

an internal gear connected to said first member of said overrunning clutch and fixed around said sun gear; and a planetary gear in engagement with said sun gear and said internal gear and disposed to be rotatable around said sun gear.

28. A rotary machine as claimed in claim 27, wherein said second member of said overrunning clutch is disposed around said first member thereof.

29. A rotary machine for a vehicle comprising:

an accessory section having an accessory shaft connected to a crankshaft of an engine;

a starter section, disposed tandem with said accessory section and having a starter shaft;

an overrunning clutch for driving said accessory shaft in one direction, said overrunning clutch having a first member connected to said starter shaft, a second member connected to said accessory shaft and a centrifugal mechanism, dispose between said first and second members, for disengaging said first member from said second member when said engine rotates said second member higher than said first member, wherein said centrifugal mechanism comprises:

a plurality of sprags;

a ring-shaped spring for exerting angular moment on said sprags to rotate the same; and a cylindrical retainer fixed to one of said first and second members to be coaxial with said spring, for loosely holding said sprags between said first and second members so that said sprags slide on one of surfaces of said first and second member due to relative movement of said first and second members when said engine starts and floats between said first and second members due to centrifugal force applied to said sprags when said engine rotates at a speed higher than a starting speed thereof.

30. A rotary machine as claimed in claim 29 further comprising a speed reduction gear section connected between said first member and said crankshaft.

31. A rotary machine as claimed in claim 30, wherein said speed reduction gear comprises a skew gear mechanism having an input gear connected to said motor shaft and a output gear connected to said first member of said overrunning clutch.

32. A rotary machine for a vehicle comprising:

an accessory section having an accessory shaft connected to a crankshaft of an engine;

a starter section, disposed tandem with said accessory section and having a starter shaft;

an overrunning clutch for driving said accessory shaft in one direction, said overrunning clutch having a first member connected to said starter shaft, a second member connected to said accessory shaft, and a centrifugal mechanism for disengaging an inner member from said second member when said engine rotates said second member at a predetermined speed higher than said first member, wherein said centrifugal mechanism comprises a plurality of centrifugal elements loosely held between said first and second members for transmitting torque between said first and second members at an engine starting speed and for floating between said first and second members due to centrifugal forces applied thereto when said engine rotates at a speed higher than said starting speed.

33. A rotary machine as claimed in claim 32, wherein said first member is a clutch inner member and said second member is a clutch outer member and said centrifugal mechanism disposed radially between said inner and outer members.

* * * * *